C. B. Rogers,
Making Rope Molding.

Nº 26,787.          Patented Jan. 10, 1860.

Witnesses:
George Perkins
Othniel Gager

Inventor
C. B. Rogers

UNITED STATES PATENT OFFICE.

C. B. ROGERS, OF NORWICH, CONNECTICUT.

MACHINE FOR CUTTING MOLDINGS.

Specification of Letters Patent No. 26,787, dated January 10, 1860.

*To all whom it may concern:*

Be it known that I, C. B. ROGERS, of Norwich, in the county of New London and State of Connecticut, have invented a new and Improved Machine for Cutting Spiral Moldings; and I do hereby declare that the following is a full, clear, and exact description of the same, reference being had to the annexed drawings, making a part of this specification, in which—

Figure 1:
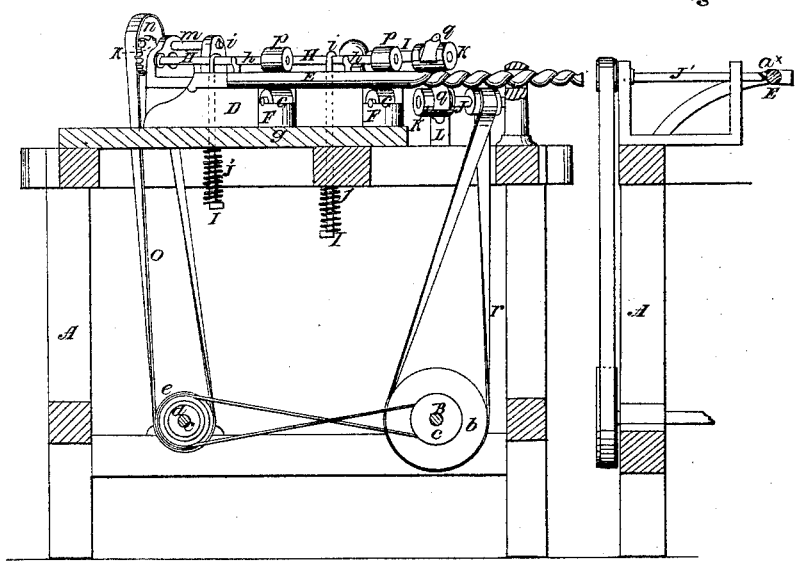
Figure 3:
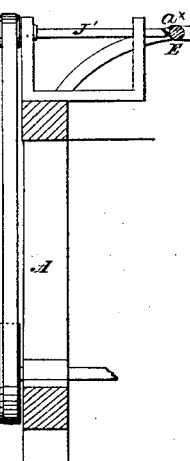
Figure 2:
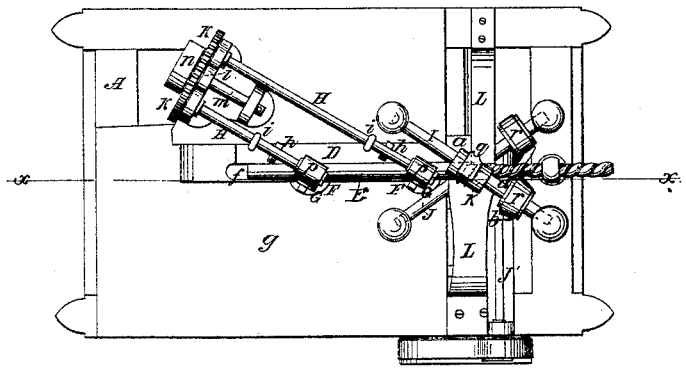

Figure 1 is a side sectional view of my invention, taken in the line $x$, $x$, Fig. 2. Fig. 2 is a plan or top view of ditto. Fig. 3, a detached view of a smoothing or finishing cutter.

Similar letters of reference indicate corresponding parts in the two figures.

This invention consists in the employment or use of feed rollers and cutter heads arranged obliquely with the stick to be cut in such a manner that the feed rollers will impart both a rotary and a longitudinal rectilineal movement to the stick while the cutters will act on the stick in a plane obliquely with it and cut the spiral bead or beads thereon.

To enable those skilled in the art to fully understand and construct my invention, I will proceed to describe it.

A, represents a rectangular frame in the lower part of which two shafts B, C, are placed transversely, B, being the power or driving shaft and having two pulleys $a$, $b$, on it of equal size and a cone of pulleys $c$. The shaft C, has a cone of pulleys $d$ placed on it and also a pulley $e$.

In the upper part of the frame A, there is placed longitudinally a bar D, which has a semi-circular recess $f$, made in it to receive the stick E, to be cut. In this bar D, at one side recesses are made to receive each a vertical cylinder F. These cylinders have their lower parts fitted in a top plate or bed $g$, on the frame A, and the bar D, is secured to this bed. The cylinders F, are allowed to turn in the bed $g$, for adjustment only, and in the upper end of each cylinder F, a roller G, is placed and allowed to turn freely. One cylinder F, is near the inner end of the bar D, and the other is near the center of the bar. The rollers G, G, project just above the lower surface of the recess $f$.

To the upper surface of the bar D, there are attached two bearings or supports $h$, $h$, in which the inner parts of the two shafts H, H, are fitted and around each shaft H, a hook $i$, passes. These hooks are at the upper ends of rods I, I, which pass down through the bed and have spiral springs $j$, on them, said springs causing the hooks to bear downward on the shafts H, H, as will be fully understood by referring to Fig. 1. On the outer ends of the shafts H, H, there are toothed wheels $k$, $k$, one on each shaft. The wheels have a pinion $l$, gearing into them, the shaft $m$, of which has a pulley $n$, at its outer end around which a belt $o$, passes, said belt also passing around the pulley $e$, of shaft C.

The shafts H, H, are parallel with each other and have an oblique position relatively with the bar D, as shown clearly in Fig. 2, and on the inner end of each shaft H, a roller $p$, is placed. These rollers have an elastic covering or exterior and they rest or bear on the upper surface of the stick E, and at points directly over the rollers G, G, which are of metal or other hard material. The rollers $p$, $p$, and G, G have opposite or nearly opposite positions relatively with each other as shown clearly in Fig. 1.

On the upper part of the frame A, there are placed two shafts I, J, which cross each other as shown clearly in Fig. 2. On each shaft I, J, a cutter head K, is placed, said heads being provided with suitable cutters $q$, corresponding to the form of the bead or work to be produced. The cutter heads K, are placed one directly over and the other directly underneath the stick E, and they are rotated by means of belts $r$, from the pulleys $a$, $b$, on the shaft B. The cutter heads, K, as well as the rollers $p$, $p$, G, G, have an oblique position relatively with the stick E, but the position of the cutter heads is a trifle more transverse relatively with the stick E, than that of the rollers $p$, $p$, G, G, as will be seen by referring to Fig. 2. J' is a shaft which is placed transversely on the frame A and at right angles with the stick E, to the inner end of this shaft a cutter $a^x$ is secured. This cutter may be of any proper form, and is more especially designed for a smoother or finisher, although when the stick is fed with the movements as hereinafter described, said cutter will cut the stick so as to form spiral bead or beads thereon.

L, L, are two bars attached to the upper part of the frame A. These bars are placed transversely on the frame A, and their inner ends form bearing surfaces for the stick E.

The operation of the machine is as follows: Motion is given the shaft B by any convenient power and the rollers $p$, $p$, G, G, and the cutter heads K, K, rotate. The sticks E are previously turned by any suitable means and the operator places one stick at a time in the recess $f$, of the bar D, and between the first pair of rollers $p$, G, which rotate the stick and feed it forward to the other pair of rollers $p$, G. The two pairs of rollers $p$, G, then act in concert on the stick and force it along between the two cutter-heads K, K, at the same time rotating it and the cutters $q$, of the cutter heads cut the bead on the stick, the bead being cut spirally on the stick owing to the relative position of the cutters therewith and the compound feed movement of the stick. The cutter $a^x$ smooths the work performed by the cutters $q$, $q$.

The molding when formed resembles a rope, and they are known generally among mechanics as "rope moldings." One, two or more strands or beads may be cut on the sticks by employing cutters $q$, $q$, $a^x$, of the proper form and having the rollers so placed relatively with the stick as to give the proper feed movement. By turning the cylinders F, F, the lower feed rollers G, G, may be placed more or less obliquely with the stick and made to modify to a certain extent the feed movement of the stick without any change in the position of the upper rollers $p$, $p$.

I would remark that it is not strictly necessary that one of the cutter heads K, be below the stick as shown in Fig. 1, for they may be placed side by side. It is preferable however to have one cutter head below in order to equalize the force or action of the cutters of the two heads and prevent friction.

Having thus described my invention what I claim as new and desire to secure by Letters Patent, is,

1. The employment or use of rotary cutter-heads K, K, provided with necessary cutters and placed obliquely with the stick E, to be operated upon, when said stick is fed between or underneath the cutters K, K, with a combined rotary and rectilinear movement for the purpose herein set forth.

2. The combination of the feed rollers and cutter-heads arranged for joint operation as described.

C. B. ROGERS.

Witnesses:
 MICHL. HUGHES,
 CHAS. M. HUGHES.